United States Patent [19]

Klatt

[11] Patent Number: 4,507,736

[45] Date of Patent: Mar. 26, 1985

[54] TRANSMISSION GEAR SHIFT CONTROL SYSTEM

[75] Inventor: Alfred Klatt, Wathlingen, Fed. Rep. of Germany

[73] Assignee: WABCO Fahrzeugbremsen GmbH, Hanover, Fed. Rep. of Germany

[21] Appl. No.: 348,038

[22] Filed: Feb. 11, 1982

[51] Int. Cl.$^3$ .......................... G05G 5/04; F16H 57/06
[52] U.S. Cl. .................................. 364/424.1; 74/475;
 74/752 D; 74/DIG. 6
[58] Field of Search .......... 364/424.1; 74/475, 752 A,
 74/752 D, 866; 192/3.26

[56] References Cited

U.S. PATENT DOCUMENTS

| | | | |
|---|---|---|---|
| 4,262,335 | 4/1981 | Ahlen et al. | 364/424.1 |
| 4,290,322 | 9/1981 | Huitema | 74/752 A |
| 4,380,177 | 4/1983 | Reinecke et al. | 74/475 |
| 4,388,987 | 6/1983 | Hennessey et al. | 192/3.26 |
| 4,414,863 | 11/1983 | Heino | 74/866 |

FOREIGN PATENT DOCUMENTS 2215994 4/1980 Fed. Rep. of Germany .

Primary Examiner—Felix D. Gruber
Attorney, Agent, or Firm—G. J. Falce

[57] ABSTRACT

A gear shift control system for a motor vehicle in which a micro-computer is fed signals representative of the output speed of the transmission and the selected gear position. This information allows the computer to recognize when the engine speed is within an optimum range. A latching mechanism associated with the gear shift lever is controlled by the computer to lock the gear shift lever. Such an arrangement avoids accidental improper shifting on the part of the operator to prevent engine damage due to over or under speeding of the engine, particularly in arrangements where the respective gear positions of the gear shift lever are arranged in line, as opposed to the conventional H configuration. The computer may be stored with several programs that can be selectively activated to vary the locking point of the gear shift lever within the optimum speed range, depending on the intent to operate the vehicle in a "speedy" or "economical" mode, for example.

7 Claims, 2 Drawing Figures

TRANSMISSION GEAR SHIFT CONTROL SYSTEM

BACKGROUND OF THE INVENTION

The present invention relates to a semi-automatic transmission control and particularly to such control for preventing the shifting of transmission gears when such action would place the engine in an unfavorable operating condition with respect to the engine speed and load condition.

In addition to the steering and brake systems being power operated, the trend in truck type automotive vehicles appears to be toward power assist shifting for transmissions, thus reducing the effort required to change gears. Power shift arrangements make possible the linear alignment of the gears, as opposed to the conventional H-formation. This facilitates gear shifting where large numbers of gears are available, such as in trucks, but introduces a danger, however, in that one or even several gears could be accidentally skipped. While the skipping of gears is sometimes desirable, engine damage due to overspeeding can result if a relatively fast moving vehicle is down-shifted to too low a gear. For example, truck engines can be oversped and destroyed at 3500 rpm. The maximum permissible speed; therefore, would be on the order of 3100 rpm, and the nominal speed approximately 2400 rpm. The optimum-engine operating range, therefore, is approximately 70% to 100% of the rated speed.

Accidental shifting into too high of a gear is also undesirable, since such a condition unduly overloads the engine, particularly when pulling a grade.

SUMMARY OF THE INVENTION

The object of the invention is to provide an arrangement for locking the gear shifting mechanism under certain operating conditions in order to prevent shifting of the transmission into an undesirable gear.

Briefly, this objective is accomplished by employing a programmed micro-processor in an electronic control unit that acts through an electro-pneumatic valve to control a mechanical latching mechanism associated with the gear shift device. Each successive gear position is monitored with respect to the instantaneous engine operating characteristics and a selected operating program. The gear latching mechanism is activated to lock the gear shift mechanism when a gear position is reached in which the engine speed is within the "optimum" speed range. This prevents further shifting to a gear in which the engine speed would be outside of the optimum speed range and thus avoids engine damage due to inadvertent over-speeding or under-speeding of the engine.

The foregoing objective and attendant advantages of the invention will be better understood from the following more detailed explanation when taken with the drawings in which.

DESCRIPTION AND OPERATION

Figure 1:
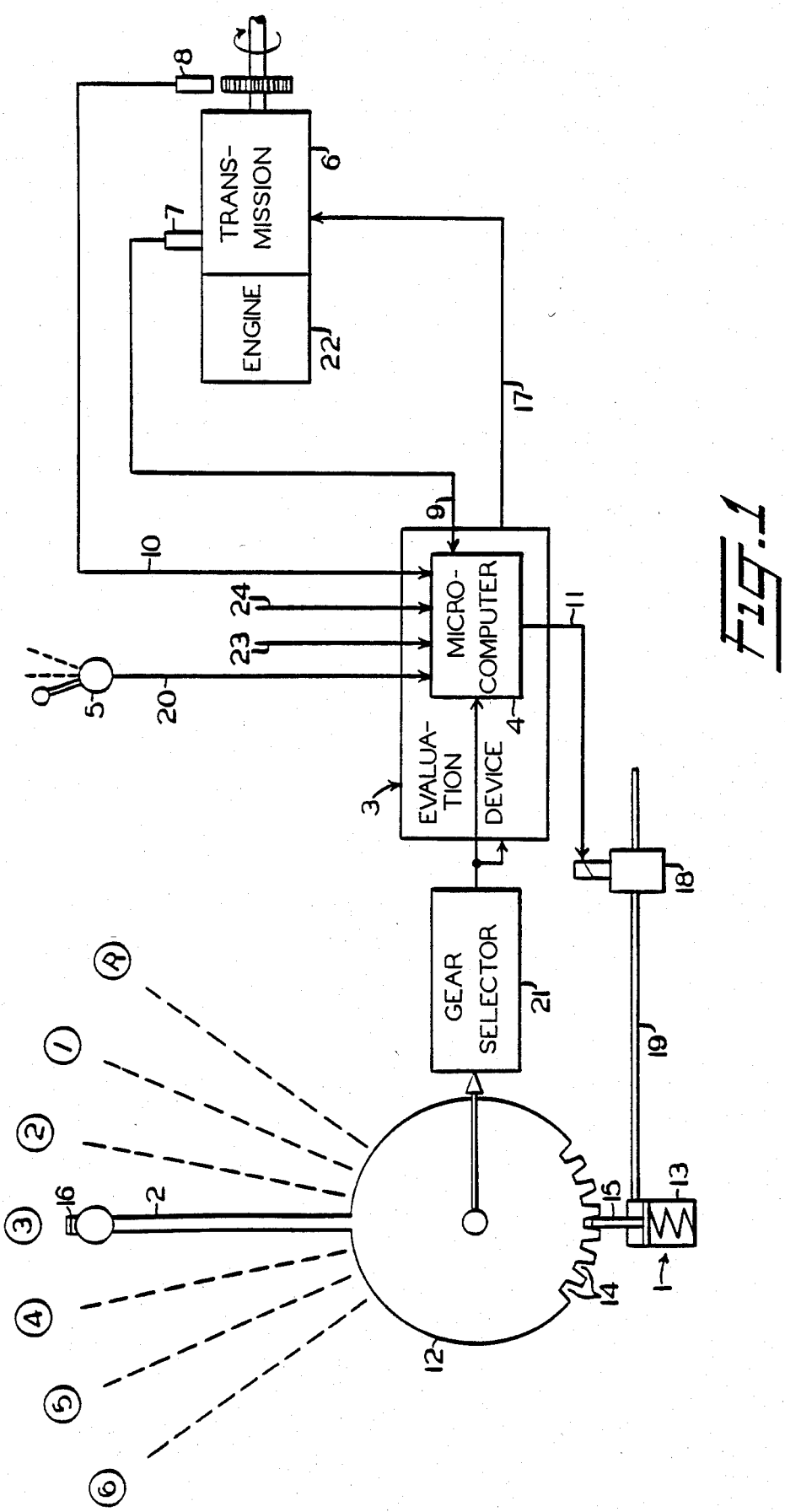
FIG. 1 shows a diagrammatic of the system comprising the invention.
Figure 2:
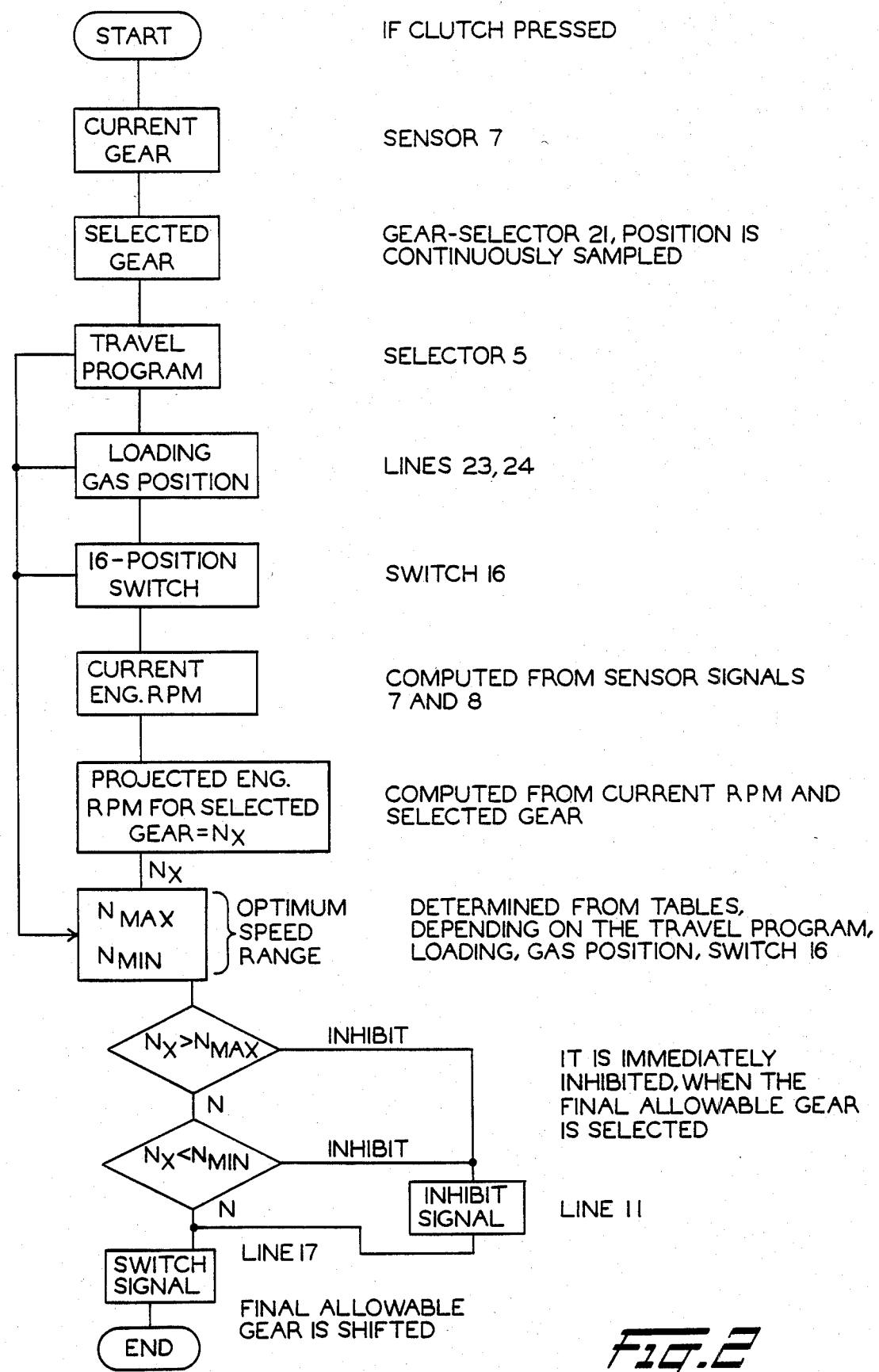
FIG. 2 shows a system flow chart in which the functions and sequence of operation are represented.

The transmission shift control system essentially consists of a gear shift lever 2, a gear shift latching device 1, a gear selector 21, an evaluation switching system 3, a driving program selector 5, an engine 22, a transmission 6, a transmission gear position sensor 7, and a transmission output speed sensor 8.

The gear shift lever 2 includes a plate 12 that is coaxial with the axis of rotation of gear shift lever 2. Plate 12 is formed with notches 14 along its peripheral edge, the respective notches corresponding to one of the forward gear positions 1-6, and to a reverse gear position R. Gear shift latching device 1 comprises a spring loaded, pneumatic actuator cylinder 13, the piston on which is formed with a pin 15 that is engageable with notches 14 in plate 12 to lock gear shift lever 2 against rotation, when compressed air is supplied to actuator cylinder 13.

A magnetic clutch device (not shown) is also envisioned as an alternative to pneumatic actuator cylinder 13, such device providing for especially fast operation.

Gear shift selector 21 monitors the position of gear shift lever 2 and transmits a corresponding code signal to evaluation switching system 3, as lever 2 is rotated through its several linearly disposed positions.

Evaluation switching system 3 gives signals to transmission 6 via line 17, whereby auxiliary force operated engagement of the desired gearing is effected. Hydraulic and pneumatic operating cylinders, magnetic clutches or electric motors may be employed as the auxiliary force for shifting the gears.

An electronic device 4 in the form of a micro-computer forms a part of evaluation switching system 3 and receives feedback signals from gear position sensor 7 via line 9 and from speed sensor 8 via line 10. These sensor signals are representative of current engine operating speeds. When the gear shift lever 2 is shifted to a new position, evaluation switching system 4 projects a new engine speed according to the sensor signals on lines 9, 10, and the signal received from gear selector 21. A line 20 transmits a signal from the driving program selector 5 to micro-computer 4 according to the desired driving mode. This signal selects the desired program which establishes the limits of an "optimum" speed range of the vehicle engine. It will be appreciated therefore that, in different selected driving modes, different optimum speed ranges will be established. For example, a "speedy" or "economical" driving mode may be selected, or a driving mode predicated on the vehicle load condition may be selected, each having an optimum speed range unique to that particular driving mode. Micro-computer 4 analyzes the aforementioned input information by comparing the projected engine speed with the limits defining the optimum speed range, in accordance with the selected driving mode program and produces an output signal by energizing or deenergizing line 11, depending upon whether or not the engine speed projected for the selected gear position lies within the optimum speed range for the program in effect.

In the event the operator moves the gear shift lever to a position which would result in an engine speed that lies outside the "optimum" speed range for the program selected, micro-computer 4 energizes line 11. The optimum required speed range is stored in a program of micro-computer 4. Energization of line 11 causes an electro-pneumatic control valve 18 to cut off a source of compressed air (not shown) from actuator cylinder 13 via a line 19, thereby allowing the spring loaded piston of cylinder 13 to engage pin 15 in a notch 14 to lock gear shift lever 2 against further shifting and accordingly prevent overspeeding or underspeeding of the vehicle engine by inappropriate gear shifting.

As long as the gear shift lever is moved to a position in which the projected engine speed is within the "optimum" speed range, line 11 will remain deenergized and electro-pneumatic valve 18 will connect compressed air to actuator cylinder 13 via line 19 to retract pin 15 from notch 14. Thus, the gear shift lever 2 is free to be moved to the next gear position, since such gear change will not result in the engine overspeeding or underspeeding.

It will be apparent, therefore, that accidental engagement of the transmission gears, such as would cause a too-high or too-low engine speed, is prevented. It is possible for the operator to move the gear shift lever 2 in either direction only until the latching device is actuated to lock-up the gear shift lever. Depending upon the operating conditions, one or even more gear positions may be skipped before the gear shift lever becomes locked against further movement. For example, in an "empty" mode of vehicle loading, driving program selector 5 sets up the program of micro-computer 4, so that the gear shift lever is only capable of being locked in every other gear position, since the intermediate gears are not necessary for accelerating an empty vehicle. In the "speedy" driving mode, micro-computer 4 is programmed to lock the gear shift lever when the engine speed reaches 100% of the nominal speed, and in the "economical" driving mode, when the engine speed reaches 70% of the nominal speed.

In the event an operator is driving with the gear shift locked, due to the engine speed lying within the "optimum" speed range, he may still shift out of the locked gear position by depressing the clutch pedal. This prerequisite condition assures that the desired shifting is not accidental, but rather is intentional. Micro-computer 4 senses the desired shifting out of the "optimum" speed range by registering clutch pedal depression following shifting of the gears to a position in which the "optimum" engine speed range is realized, in order to deenergize line 11 and thereby disengage locking pin 15 to permit the desired movement of gear shift lever 2. Such further movement of gear shift lever 2 is, limited, however, to a single gear position, provided the engine speed within this additional gear position will not increase beyond the "maximum permissible speed."

In addition, a manually operable switch 16 may be located on the gear shift lever in order to de-activate the latching mechanism 1, as, for example, by energizing the solenoid of electro-pneumatic valve 18.

Alternatively, manual switch 16 may be arranged to activate a "maximum permissible engine speed" program stored in micro-computer 4. When switch 16 is operated, the program activated by program selector 5 is bypassed in favor of the "maximum permissible engine speed" program. The switch is arranged to override the locking of the gear shift lever, as would otherwise occur with the aforementioned programs of micro-computer 4. By activating the "maximum permissible speed" program, locking of the gear shift will only occur when the engine speed reaches the limit of the maximum permissible speed.

As a further alternative to employing program selector 5 to select the desired program, in accordance with which the micro-computer analyzes the engine operating condition, program selector 5 may be bypassed and information regarding the operating condition of the vehicle, such as its load and position of the gas pedal, can be picked up by sensors (not shown) and transmitted to micro-computer 4 via additional inlets 23 and 24. These signals then effect the selection of certain stored driving programs.

By means of the above-described transmission gear shift control system, accidental faulty shifting of gears by the driver is avoided without unduly restricting the driver's choice of gears. Operation of the vehicle is thus simplified, safer and more efficient.

Having now described the invention, what I claim as new and desire to secure by Letters Patent, is:

1. Gear shift control apparatus for the transmission of a motor vehicle including a gear shift lever, means for producing a code signal representative of different positions of the gear shift lever, and evaluation means for selecting and controlling the setting of the gears of said transmission in accordance with said code signal, wherein the invention comprises:
    (a) a gear shift latch to lock the gear shift lever in any one of said different positions;
    (b) a speed sensor associated with the transmission output shaft to provide a signal according to the output speed of said transmission;
    (c) a position sensor to provide a signal according to the gear position in which said transmission is currently operating;
    (d) said evaluation means further including electronic means responsive to said speed sensor and said position sensor signals, and to said code signal for providing a signal corresponding to a projected engine speed, and for further providing an output signal for effecting operation of said latch to lock said gear shift lever when said projected engine speed signal lies outside the limits of a predetermined speed range.

2. Gear shift control apparatus as recited in claim 1, wherein said gear shift lever is movable to said different positions in a linear direction.

3. Gear shift control apparatus as recited in claim 2, wherein said latch comprises:
    (a) a plate connected to said gear shift lever and having a plurality of notches 14 therein; and
    (b) a fluid pressure controlled, spring loaded actuator cylinder having an actuator pin that is engageable with a respective one of said plurality of notches to lock said gear shift lever in said any one of said different positions.

4. Gear shift control apparatus as recited in claim 3, wherein said latch further comprises an electropneumatic control valve operative responsively to the output of said electronic means to either supply fluid pressure to said actuator cylinder or to exhaust fluid pressure from said actuator means.

5. A gear shift control apparatus, as recited in claim 1, further comprising selector means for conditioning said electronic means to establish the limits of said predetermined speed range according to the intended driving mode.

6. A gear shift control apparatus, as recited in claim 5, wherein said electronic means establishes the upper limit of said predetermined speed range at 100% of the nominal engine speed when said selector means is set in a "speedy" driving mode.

7. A gear shift control apparatus, as recited in claim 5, wherein said electronic means establishes the upper limit of said predetermined speed range at 70% of the nominal engine speed when said selector means is set in an "economical" driving mode.

* * * * *